US005538686A

United States Patent [19]
Chen et al.

[11] Patent Number: 5,538,686
[45] Date of Patent: Jul. 23, 1996

[54] ARTICLE COMPRISING A PB-FREE SOLDER HAVING IMPROVED MECHANICAL PROPERTIES

[75] Inventors: Ho S. Chen, Lebanon; Sungho Jin, Millington; Mark T. McCormack, Summit, all of N.J.

[73] Assignee: AT&T Corp., Murray Hill, N.J.

[21] Appl. No.: 278,673

[22] Filed: Jun. 27, 1994

Related U.S. Application Data

[63] Continuation of Ser. No. 55,495, Apr. 30, 1993, abandoned.
[51] Int. Cl.$^6$ .................................................. C22C 13/00
[52] U.S. Cl. .......................... 420/557; 420/558; 420/559; 420/560; 420/561; 420/562
[58] Field of Search ................................ 420/557, 558, 420/559, 560, 561, 562

[56] References Cited

U.S. PATENT DOCUMENTS

| 4,695,428 | 9/1987 | Ballentine et al. | 420/561 |
| 4,797,328 | 1/1989 | Boehm et al. | 420/557 |
| 4,806,309 | 2/1989 | Tulman | 420/561 |
| 5,242,658 | 9/1993 | Stevens et al. | 420/557 |

FOREIGN PATENT DOCUMENTS 2197396  8/1990  Japan.

OTHER PUBLICATIONS

W. B. Hampshire, Electronic Materials Handbook vol. 1, Packaging, ASM International, Metals Park, OH, 1989, p. 633.
C. Lea, "A Scientific Guide to Surface Mount Technology", Electrochemical Publications, Ltd. pp. 353–361 (1988).

*Primary Examiner*—David A. Simmons
*Assistant Examiner*—Robert R. Koehler
*Attorney, Agent, or Firm*—Eileen D. Ferguson; Dexter K. Chin; Patricia A. Verlangieri

[57] ABSTRACT

Pb-free solder alloys based on the Sn-In-Zn system (exemplarily 86:5:9 weight %) are disclosed. Compositions can have a melting temperature in the range 183° C.±10° C. and thus can be readily substituted for conventional 40 Pb-60 Sn solder. The novel compositions also can possess superior mechanical properties, compared to the 40/60 Pb-Sn composition, and readily wets copper. Bi and/or Sb may be added to the Sn-In-Zn base to reduce the tendency for the formation of lower temperature phases.

5 Claims, 1 Drawing Sheet

ARTICLE COMPRISING A PB-FREE SOLDER HAVING IMPROVED MECHANICAL PROPERTIES

This application is a continuation of application Ser. No. 08/055495, filed on Apr. 30, 1993 now abandoned.

FIELD OF THE INVENTION

This invention relates to Pb-free solder, and to an article comprising the solder.

BACKGROUND OF THE INVENTION

Solder bonding is a critical step in many industrial processes, e.g., in interconnection and packaging of electronic devices. The most widely used solder is the near eutectic Pb-60% (by weight) Sn alloy. However, due to the toxicity of lead (Pb), there is currently substantial interest in Pb-free substitute solder compositions. Some such compositions are known, (see, for instance, W. B. Hampshire, Electronic Materials Handbook Vol. 1, Packaging, ASM International, Metals Park, Ohio, 1989, p.633).

However, known Pb-free solder compositions have melting temperatures that differ significantly from that of the standard Pb-Sn solder, and have not found significant use in, e.g. electronic packaging. It is common practice in electronic packaging to solder the various levels of the package with different solders of different melting points, selected so that the soldering of each successive level does not inadvertently melt the previously soldered level. Thus, use of a substitute solder having a melting point that differs substantially from that of the solder that is being replaced might require re-design of the packaging operation (a very expensive proposition), or else could cause problems in manufacturing sequences, efficiency, and/or yields. In view of the strong reasons for avoiding Pb-based solder, it would be very desirable to have available a Pb-free solder composition having a melting temperature close (e.g., within ±10° C.) to that of the standard 40/60 Pb-Sn solder, and having other characteristics (e.g., strength, wettability, creep resistance) that make it suitable as a substitute solder for the standard Pb-based solder. This application discloses such a composition.

THE INVENTION

Figure 1:
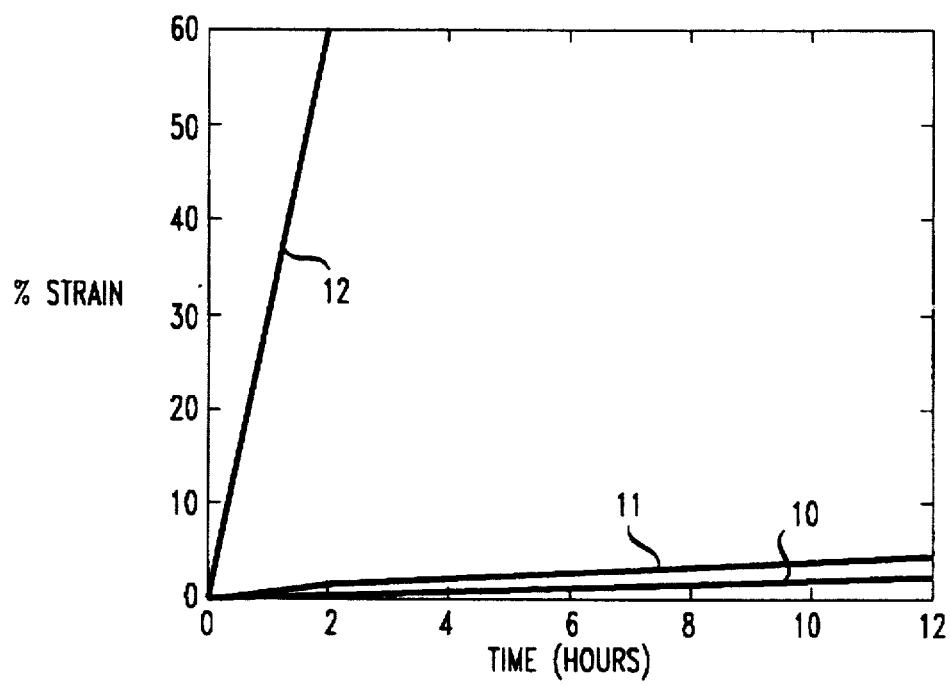
FIG. 1 compares creep deformation of samples of Pb-60%Sn, Sn-5%In-9%Zn, and Sn-10%In-9%Zn, respectively.

In a broad aspect the invention is embodied in an article that comprises an essentially Pb-free solder composition having a melting temperature that is close to (desirably within ±10° C.) that of conventional eutectic or near-eutectic Pb-Sn solder. By "melting temperature" we mean herein the liquidus temperature.

More specifically, the Pb-free composition according to the invention comprises Sn (at least 70, typically at least 80 weight %), Zn (between 3 and 15 weight %, preferably between 6 and 10 weight % ), and an amount of In that is effective for causing the composition to have a melting temperature that is at least 5° C. lower than the melting temperature of an otherwise identical, In-free comparison composition. Preferably the In content is selected to yield a melting temperature within ±10° C. of the melting temperature (approximately 183° C.) of 40/60 Pb-Sn solder and is typically in the range 1–15, preferably 3–10 weight %. The major constituent of the remaining portion of the composition is Sn. Optionally, compositions according to the invention can contain Bi and/or Sb, with the range of the former being 0–10 (preferably at most 5) weight %, and the range of the latter being 0–5 (preferably at most 3) weight %.

Compositions according to the invention not only can have a desirable melting temperature but, quite surprisingly, can have high strength (as expressed by the room temperature ultimate tensile strength or UTS, and/or room temperature 0.2% offset yield strength or YS) and creep resistance, as well as good wetting properties. More specifically, preferred compositions have at least 10% higher UTS and/or YS than 40/60 Pb-Sn, and at least 100% higher creep resistance than 40/60 Pb-Sn, with wetting ability comparable to that of 40/60 Pb-Sn.

Addition of optional Bi will typically result in a somewhat lower melting point whereas, depending on the specific alloy composition, addition of optional Sb will either have little effect on the melting temperature or raise the melting temperature somewhat. However, we have discovered that addition of Bi and/or Sb can result in a refined alloy microstructure and reduced tendency for the formation of undesirable lower melting temperature phases.

Alloys according to the invention optionally may also comprise minor amounts (typically at most 10 weight % in the aggregate) of elements such as Ag, Au, or Cu, added for various purposes such as increasing the solder strength, or further improving wetting behavior on certain surfaces. The desirable amounts of each of these optional constituents are 0–5, preferably at most 2, weight %. Minor amounts of other elements may also be used for a variety of reasons, as is in general known to those skilled in the art. The total amount of optional elements present will typically be at most 15 weight %.

Compositions according to the invention may be prepared by any of a number of known techniques. Exemplary techniques are melting of a mixture of elemental or partially alloyed metals, preferably in an inert atmosphere, deposition of thin or thick films by electrochemical processes such as electroplating, electroless plating and electrophoresis, chemical vapor deposition, evaporation and sputtering.

Compositions according to the invention may be shaped, by any appropriate method, into articles in the form of wires, ribbons, bars or preforms. They can also be incorporated in the form of a powder into solder paste or cream. Solder according to the invention can be used in the manufacture of articles (e.g., surface mounted circuit boards or laser chips solder-bonded to a sub-mount), utilizing known techniques such as wave soldering, dip soldering, or laser soldering. Alternatively, reflow soldering of solder paste, or deposited and patterned solder layers can also be used.

For manufacturability reasons it is frequently desirable that the solder should wet the relevant surface (e.g., copper) within about 2 seconds. Preferred compositions according to the invention have this ability.

Wetting can generally be further improved by use of an inert (e.g., $N_2$) or reducing (e.g., forming gas) atmosphere, or by carrying out the soldering operation under a blanket of oil (e.g., propylene glycol).

EXAMPLES

Example 1

A Pb-60 wt % Sn binary alloy was prepared from high purity, elemental Pb and Sn. The alloy was melted within a quartz tube having an inside diameter of 14 mm under argon atmosphere, held at 800° C. for 8 hours, and furnace-cooled. The resulting ingot was swaged to 3.7 mm diameter, remelted within 4 mm inner diameter quartz tubes in an argon atmosphere at 300° C. for 5 minutes, and then cooled to room temperature. The thus produced rods were then machined into tensile specimens with a 0.5-inch gauge length and 0.120-inch gauge diameter. Tensile tests were performed at room temperature at a strain rate of $1.67 \times 10^{-3}$ $\sec^{-1}$. The 0.2% offset yield strength (YS) was approximately 4500 psi and the ultimate tensile strength (UTS) was approximately 5000 psi. The melting temperature of the alloy was approximately 183° C. Sn-9 weight %Zn-5 weight %In ternary alloy tensile specimens were prepared and tested in substantially the same manner as described above. The results were as follows: the YS was approximately 8000 psi, the UTS was approximately 9000 psi, and the melting temperature was approximately 188° C. No detectable amount of undesirable phases with lower melting temperatures was found.

Example 2

Sn-9 weight %Zn-10.0 weight %In ternary alloy specimens, prepared in substantially the same manner as in Example 1, had a melting point of approximately 178° C.

The alloy compositions of examples 1 and 2 were subjected to creep testing at 100° C., under a 1000 psi compressive load. FIG. 1 shows exemplary results of these tests, with numerals 10 and 11 pertaining, respectively, to the inventive compositions of examples 1 and 2, respectively, and numeral 12 pertaining to the prior art Pb-Sn composition. The dramatic improvement in creep resistance is evident.

Figure 2:
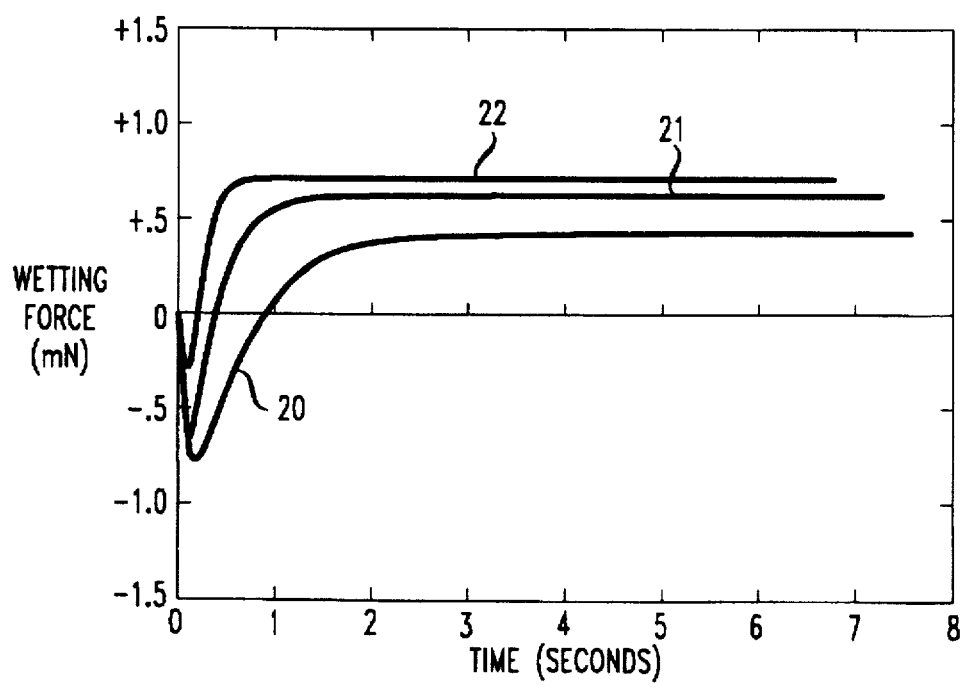
FIG. 2 shows solderability data measured by the wetting balance test.

FIG. 2 shows exemplary data on wetting force on copper, obtained at 245° C. in air, using a commercially available (London Chemical Co., Bensenville, Ill. 60106) neutral organic acid flux (NF 3000). The data were obtained by a standard test, generally referred to as the wetting balance test. See, for instance, "A Scientific Guide to Surface Mount Technology", C. Lea, Electrochemical Publications, Ltd., (1988), especially pp. 353–361. In FIG. 2, reference numerals 20 and 21 pertain to a prior art 91/9 weight % Sn-Zn eutectic alloy and the inventive composition of Example 1, respectively, and numeral 22 to the prior art Pb-Sn composition. As can be seen from FIG. 2, the composition according to the invention wets copper, substantially as well as the prior art Pb-Sn composition does, and substantially better than the prior art Sn-Zn composition. More specifically, preferred compositions achieve maximum wetting force in less than 2 seconds, with the maximum wetting force being at least 50% of that of 40/60 Pb-Sn solder at the same conditions (including use of an inert or reducing atmosphere and a conventional low solid flux, or submerged under oil).

What is claimed is:

1. An article comprising a solder composition, the solder composition comprising an alloy having at least approximately 70 percent tin, approximately 6–10 weight percent zinc, approximately 3–10 weight percent indium, and an effective amount of bismuth not greater than approximately 10 weight percent to reduce the tendency for the formation of lower temperature phases.

2. An article according to claim 1 wherein the article is a solder paste, cream, preform, wire, ribbon, or bar.

3. An article according to claim 1, wherein the alloy further comprising at least one element selected from antimony, copper, silver and gold, being present in an individual amount of not greater than approximately 5 weight percent, the total amount selected being not greater than approximately 15 weight percent.

4. An article comprising a solder composition, the solder composition comprising an alloy having at least approximately 70 weight percent tin, approximately 6–10 weight percent zinc, approximately 3–10 weight percent indium, and an effective amount of antimony not greater than 5 weight percent to reduce the tendency for the formation of lower temperature phases.

5. An article according to claim 4 wherein the article is a solder paste, cream, preform, wire, ribbon, or bar.

\* \* \* \* \*